US009599756B2

(12) United States Patent
Scheiding et al.

(10) Patent No.: US 9,599,756 B2
(45) Date of Patent: Mar. 21, 2017

(54) METHOD FOR MANUFACTURING A MIRROR COMPRISING AT LEAST ONE CAVITY AND OPTICAL MIRROR

(75) Inventors: Sebastian Scheiding, Berlin (DE); Andreas Gebhardt, Apolda (DE); Christoph Damm, Jena (DE); Michael Scheiding, Berlin (DE); Stefan Risse, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 390 days.

(21) Appl. No.: 14/236,515

(22) PCT Filed: Aug. 1, 2011

(86) PCT No.: PCT/EP2011/003929
§ 371 (c)(1),
(2), (4) Date: May 6, 2014

(87) PCT Pub. No.: WO2013/017144
PCT Pub. Date: Feb. 7, 2013

(65) Prior Publication Data
US 2014/0247512 A1    Sep. 4, 2014

(51) Int. Cl.
G02B 5/08    (2006.01)
G02B 5/10    (2006.01)
(Continued)

(52) U.S. Cl.
CPC .............. *G02B 5/10* (2013.01); *B22F 3/1055* (2013.01); *B22F 5/10* (2013.01); *G02B 23/06* (2013.01);
(Continued)

(58) Field of Classification Search
CPC  B22F 3/1055; B22F 2998/10; B22F 2999/00; B22F 2003/247; B22F 2304/10;
(Continued)

(56) References Cited

U.S. PATENT DOCUMENTS 4,443,059 A     4/1984  Wells
5,565,052 A  * 10/1996  Papenburg ............ C04B 37/001
                                                  156/155
(Continued)

FOREIGN PATENT DOCUMENTS

DE         19856783       6/2000
EP         0209366        1/1987
(Continued)

OTHER PUBLICATIONS

"International Application No. PCT/EP2011/003929, International Search Report and Written Opinion mailed Apr. 10, 2012", 10 pgs.
(Continued)

*Primary Examiner* — Zachary Wilkes
*Assistant Examiner* — Daniel Manikeu
(74) *Attorney, Agent, or Firm* — Schwegman Lundberg & Woessner, P.A.

(57) ABSTRACT

The invention relates to a method for manufacturing a light weight optical mirror or a monolithic mirror comprising at least one cooling channel, the method comprising forming a mirror body by iteratively depositing a metallic powder in layers and applying, for each of the layers, heat at least in a subarea of this layer, thereby fusing or sintering the powder in this subarea and bonding it to a previously deposited layer, the powder remaining in an unfused state in at least one region, the method further comprising forming at least one cavity within the carrier by removing the unfused powder from said region and producing a mirror surface at
(Continued)

Figure 1:
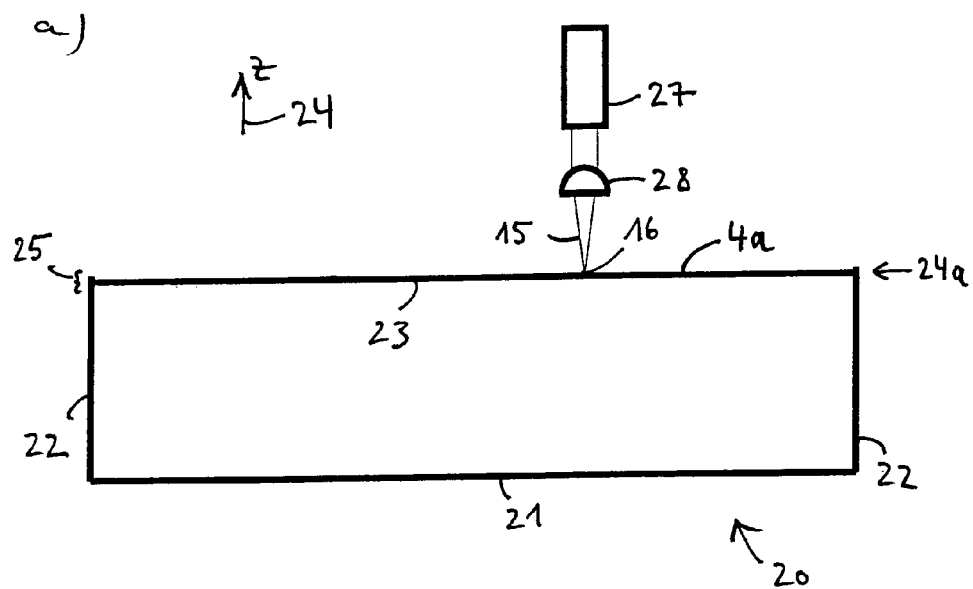
Figure 1:
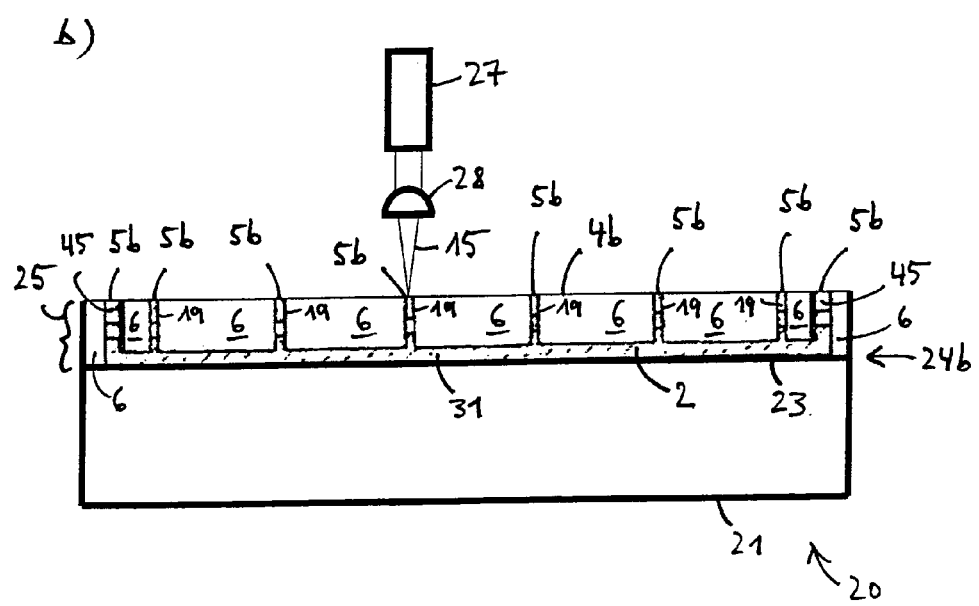
Figure 1:
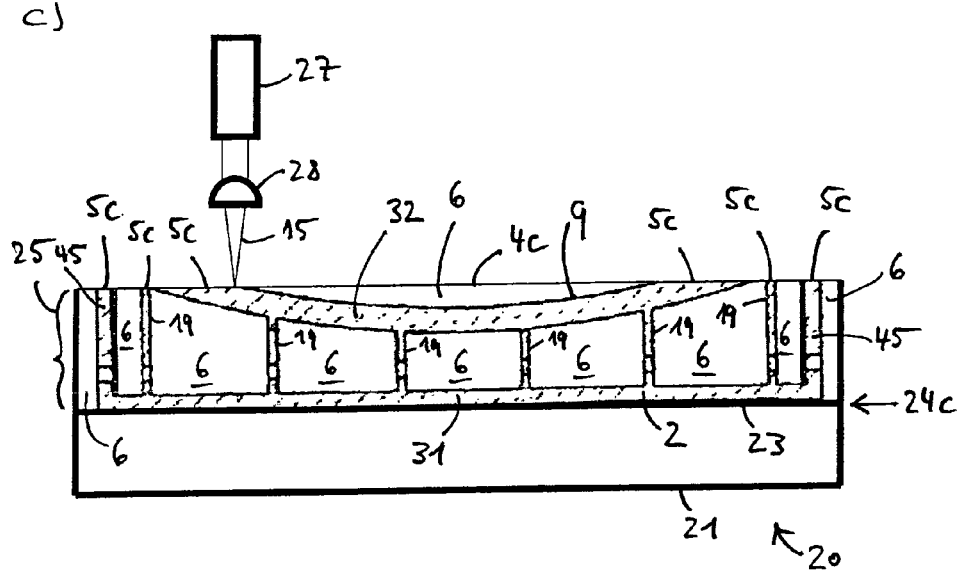
Figure 1:
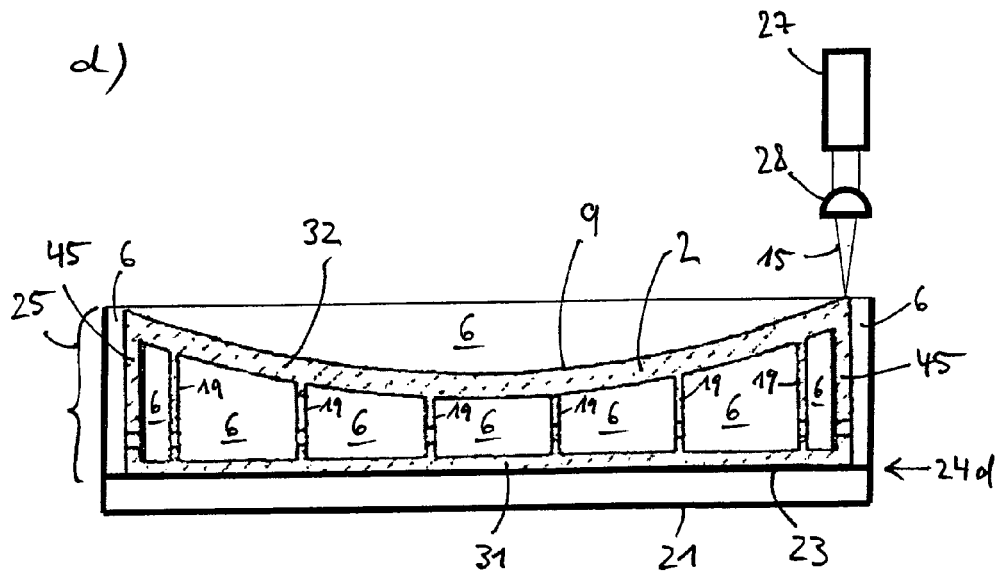

a closed surface of the mirror body. The invention further relates to an optical mirror and to an optical device.

21 Claims, 8 Drawing Sheets

(51) Int. Cl.
*B22F 3/105* (2006.01)
*G02B 23/06* (2006.01)
*B22F 5/10* (2006.01)

(52) U.S. Cl.
CPC ....... *B22F 2998/10* (2013.01); *B22F 2999/00* (2013.01); *Y02P 10/295* (2015.11)

(58) Field of Classification Search
CPC . B22F 5/10; B22F 1/0003; G02B 5/08; G02B 7/183; G02B 7/1815; G02B 7/182; G02B 5/10; G02B 23/06; G02B 7/008; G02B 7/181; G02B 5/0858; G02B 2006/12166; C04B 2237/16; H01S 3/036; H01S 5/024; H01S 5/026; Y02E 10/46
USPC ....... 359/900, 883, 838, 848, 871, 845, 850; 427/191, 205, 585, 249.2, 452, 527; 156/153
See application file for complete search history.

(56) References Cited

U.S. PATENT DOCUMENTS

| | | | | |
|---|---|---|---|---|
| 6,206,531 | B1* | 3/2001 | Williams | G02B 5/08 359/846 |
| 8,602,576 | B1* | 12/2013 | Desmitt | G02B 7/182 359/883 |
| 2004/0091011 | A1* | 5/2004 | Liu | B82Y 20/00 372/50.11 |
| 2009/0147386 | A1 | 6/2009 | Sogard et al. | |
| 2011/0045120 | A1* | 2/2011 | Higashi | B22F 5/007 425/552 |
| 2011/0051267 | A1 | 3/2011 | Kierey et al. | |
| 2011/0255068 | A1* | 10/2011 | Kools | G02B 5/0891 355/71 |

FOREIGN PATENT DOCUMENTS

| | | |
|---|---|---|
| EP | 0764487 | 3/1997 |
| EP | 1972321 | 9/2008 |
| GB | 2077938 | 12/1981 |
| WO | WO-2011/023598 | 3/2011 |
| WO | WO-2011/039469 | 4/2011 |

OTHER PUBLICATIONS

Kowbel, W., et al., "Lightweight c-sic composite mirrors", Proceedings. 2003 IEEE Aerospace Conference, 2003, vol. 4, (2003), 4_1699-4_1703.

* cited by examiner

METHOD FOR MANUFACTURING A MIRROR COMPRISING AT LEAST ONE CAVITY AND OPTICAL MIRROR

PRIORITY CLAIM TO RELATED APPLICATIONS

This application is a national stage application under 35 U.S.C. §371 of PCT/EP2011/003929, filed Aug. 1, 2011, and published as WO 2013/017144 on Feb. 7, 2013, which application and publication are incorporated by reference as if reproduced herein and made a part hereof in their entirety, and the benefit of priority of each of which is claimed herein.

The invention relates to a method for manufacturing a light weight optical mirror or a monolithic mirror with internal cooling channels, to a corresponding optical mirror and to an optical device.

In a variety of applications in the field of optics there is demand for light weight optical components, in particular for light weight optical mirrors. For instance, an optical mirror of a space telescope should exhibit a reduced weight to minimize transportation costs and to reduce mechanical distortions caused by high inertial forces. The same applies to optical mirrors which are regularly exposed to large accelerations during their operation as e.g. in scanning experiments.

In order to reduce the weight of an optical mirror it is known from the prior art to manufacture the optical mirror from a material featuring a low density and thus a low weight while at the same time providing a sufficient degree of mechanical rigidity and stiffness, such as e.g. aluminium and beryllium.

Another way of reducing the weight of an optical mirror consists in making the mirror at least partially hollow. To this end the mirror can be produced from a variety of separately manufactured components. However, joining separate components together usually complicates the manufacturing process. Furthermore, even slight deviations from a calculated shape of the separate components can cause disadvantageous mechanical stresses within an assembled structure of the mirror. During the life cycle, also the long term stability and thermal conductivity are negatively influenced by joints.

Another reason for proving at least one cavity within a mirror body may be the need of cooling channels.

The aforementioned disadvantages can be partially circumvented by e.g. casting the mirror as a solid block and by introducing cavities into the clock via cutting, drilling or grinding. However, as the cavities are formed by accessing the block from its outside, the cavities cannot be given any desired shape. In particular, an arrangement of the cavities is not independent of a shape of the block surface. Therefore, it is generally not possible to form the cavities such that the resulting structure features an ideal ratio of mechanical stiffness over weight.

In a slightly more advantageous casting method, the cavities are formed during the casting process by introducing a packing into a corresponding mould used for the casting of the mirror. However, removing the packing from the mirror after the casting process can be labour-intensive and costly.

Thus, it is an objective of the present invention to suggest a method for producing a light weight optical mirror wherein the mirror is manufactured such that it features both a high degree of mass reduction and a high degree of mechanical stiffness and/or at least one cavity which can be used as a cooling channel and wherein the method comprises a preferably small number of production steps and can be implemented at preferably low cost. Furthermore, it is an objective of the present invention to design a corresponding light weight optical mirror or a mirror comprising at least one cooling channel with the aforementioned advantageous features.

This objective is achieved by a method for producing a light weight optical mirror or for producing a monolithic mirror comprising at least one cooling channel and by an optical mirror according to the independent claims. Advantageous embodiments of the invention are described in the dependent claims.

According to the invention a method for manufacturing a light weight optical mirror or for manufacturing a monolithic mirror comprising at least one cooling channel comprises forming a mirror body by
  iteratively depositing a metallic powder in layers and
  applying, for each of the layers, heat at least in a subarea of this layer, thereby fusing or sintering the powder in this subarea and bonding it to a previously deposited layer,
the powder remaining in an unfused state in at least one region, and the method further comprises
  forming at least one cavity within the mirror body by removing the unfused powder from said region and
  producing a mirror surface at a closed surface of the mirror body by means of machining and/or figuring and/or coating.

By this method thus the mirror body is formed from the metallic powder in a primary shaping process in such a way that the resulting mirror body is at least partially hollow. Thus, a high degree of mass reduction is realized in a comparatively simple way.

Forming the at least one cavity within the mirror body by removing the unfused powder from said region results in the mirror body having a particularly low weight compared to mirror bodies without cavities. Consequently, inertial forces exerted on the optical mirror due to accelerations are particularly small, resulting in a smaller distortion of the mirror due to the inertial force resulting from an acceleration. Also, less material is needed for producing the mirror leading to lower production costs. The cavity or each of the cavities can be a continuous volume, at least 70 percent, preferably at least 90 percent, most preferably at least 95 percent of a surface of this volume being enclosed by a continuous part of the mirror body.

Forming the mirror body by iteratively depositing the metallic powder in layers and by applying, for each of the layers, heat at least in the subarea of the corresponding layer, thereby fusing or sintering the powder in this subarea and bonding it to a previously deposited layer is a fast and highly flexible way of shaping the mirror body. Notably, the mirror body and the cavity within the mirror body can be easily given any desired three dimensional shape by determining the subarea in each layer where the metallic powder is to be sintered or fused and by determining the region where the metallic powder is to remain in the unfused or unsintered state. In particular, a shape of a surface of the mirror body can be chosen virtually independent of the shape of the at least one cavity. This is not the case if the at least one cavity is worked into e.g. an existing metal block, as it is known from the prior art. As the shape of the surface of the mirror body generally has a great influence on the overall stiffness of the mirror body, application of the presently proposed method yields an optical mirror combining a high degree of mass reduction with a high level of mechanical stiffness.

Typically, the three dimensional shape of the mirror body is stored as a three dimensional CAD model and can be accessed by a control unit capable of controlling the application of heat in the subareas of the different layers. The subareas then correspond to two dimensional cross sections of the CAD model. Thus, a mirror body with a different three dimensional shape, e.g. with a different configuration of the at least one cavity or with a differently shaped surface, can easily be formed without the need to modify a forming or shaping apparatus. All that is required to produce a differently shaped mirror body is to store a different three dimensional CAD model. Therefore, the presently described method is highly flexible and can be easily automated.

Forming the cavity by removing the metallic powder from said at least one region where the powder remains in the unfused state is simpler and cheaper to implement than e.g. drilling or milling the cavity out of a solid block, as is known from the prior art. Preferably, the fusing or sintering is carried out in such a way that the at least one region can be accessed from outside the mirror body or outside the mirror so that the powder can be easily removed to form the cavity or the cavities.

Reducing the mass of the optical mirror by introducing the at least one cavity within the mirror body makes the optical mirror less prone to changes in temperature. Evidently, the light weight optical mirror is easy to transport and/or to manage, as forces and/or an amount of energy required to move the mirror can be kept small.

The metallic powder need not be made entirely of metal but may comprise other non metallic, preferably non organic components or additives. Fusing and/or sintering the powder may include partially and/or completely melting individual grains of the powder.

A thickness of the different layers before the application of heat in the subarea may range between 10 µm and 200 µm, preferably between 50 µm and 100 µm. The subarea denotes a three dimensional volume which extends over the entire thickness of a given layer.

Typically, a fusing volume of the subarea, inside which heat is applied at a given instant, has a diameter which is equal to or slightly larger than the thickness of the different layers. This way the fusing and/or melting and/or sintering of the powder is carried out most effectively, as virtually all the heat deposited in the subarea at a given instant is used to fuse and/or melt and/or sinter the powder and to fuse and/or melt and/or sinter it to a previously deposited layer. Preferably, a size of the fusing volume may be varied during the forming of the mirror body. Thereby, a required accuracy, i.e. spatial resolution with which the mirror body is formed can be adjusted locally so that the forming of the mirror body can be carried out at a desired speed and/or a desired accuracy. Of course, heat may be applied in a plurality of fusing volumes simultaneously, thereby significantly speeding up the primary shaping process.

Depending on an application for which the optical mirror is produced, a typical size of the optical mirror and/or a typical size of the mirror body may range from a few centimeters, as e.g. in scanning mirrors designed for fast imaging applications, up to several meters, as e.g. in telescopes.

A stiffness of the mirror body can be advantageously increased by forming the mirror body such that a rear surface of the mirror body is completely closed or nearly completely closed, the rear surface being arranged on a side of the mirror body averted from the mirror surface. For instance, the rear surface can form a continuous surface of the mirror body, with holes or recesses which perforate the rear surface amounting to less than 20 percent, preferably less than 10 percent, most preferably less than 5 percent of the rear surface, i.e. of the rear surface including an area of the holes or recesses within the rear surface. By closing or nearly closing the rear side of the mirror body a resistance of the mirror body to mechanical bending and/or deflection is enhanced, as expressed by an increased second moment of area of the mirror body. Additionally, forming the mirror body such that the rear surface of the mirror body is closed prevents a shift of a centre of mass of the mirror body and/or of the optical mirror towards the optical surface of the mirror or towards the closed surface of the mirror body at which the optical surface is to be formed. Also, the closed rear surface of the mirror body may facilitate handling the mirror body and/or the optical mirror during production and/or during operation of the optical mirror and/or the mirror body.

In a further advantageous embodiment of the invention the cavity is formed such that it comprises at least a section of a neutral axis of the mirror body, wherein the neutral axis is defined as an axis of the mirror body along which longitudinal stresses or strains are minimal as the mirror body is bent or distorted. Preferably, the cavity comprises the neutral axis completely. A region of the mirror body which comprises the neutral axis of the mirror body yields a minimal contribution to the second moment of area of the mirror body, i.e. to the resistance of the mirror body to mechanical bending or deflection. Thus, forming the cavity such that it comprises at least a section of the neutral axis of the mirror body reduces the mass of the mirror body while minimally decreasing its stiffness. Thus, forming the cavity to comprise the neutral axis yields a mirror body with an ideal ratio of stiffness over mass.

The above mentioned advantages associated with reducing the mirror body's mass are particularly pronounced if the at least one cavity is formed such that it amounts to between 50 and 90 percent by volume of the optical mirror. Equivalently, the cavity is advantageously formed such that it amounts to between 50 and 90 percent by volume of the mirror body.

The cavity or each of the cavities will have at least one opening for removing the unfused powder. Advantageously, the cavity or each of the cavities may be formed such that the cavity or each of the cavities has at least two distinct openings at a surface of the mirror body. This way, removing the unfused powder from the at least one region of the mirror body is greatly simplified.

According to another advantageous embodiment of the invention the at least one cavity is formed to comprise a channel or a system of channels for conducting a liquid or a gas. The liquid or gas, which may be utilized as a coolant for regulating a temperature of the optical mirror during operation, may be easily circulated through the cavity or through some or each of the cavities. Thus, the at least one cavity may, in particular be a coolant channel or several cooling channels.

Several cavities which are connected to one another via connecting channels and/or recesses may be connected to the same at least two distinct openings at the surface of the mirror body. Having a coolant circulating through the cavity or the cavities is particularly advantageous for applications of the optical mirror where large amounts of heat must be dissipated, e.g. in applications where the optical mirror is exposed to particularly strong irradiation.

A particularly simple and effective way of removing the unfused powder comprises blowing out the at least one cavity. Preferably, the powder is blown out by means of compressed air and/or by means of a combination of a gas and an abrasive medium. Blowing out the cavity is most effective if the cavity or each of the cavities has at least two distinct openings at the surface of the mirror body. Adding the abrasive medium, such as grains of sand or metal, to the compressed air or gas may smoothen a surface of the cavity or of the cavities for further processing.

In advantageous embodiments of the invention the metallic powder is deposited in a composition comprising aluminium and silicon or in a composition comprising aluminium and beryllium or in any aluminium alloy composition. Aluminium has a low density while at the same time being mechanically stiff. A fitness of a composite of aluminium and silicon for welding and/or sintering and/or fusing is known to increase with increasing silicon content.

It may be advantageous to vary the composition of the metallic powder in the course of the forming of the mirror body. E.g. a silicon component of the metallic powder may be varied between 27 and 87 percent by weight. The composition of the metallic powder may be varied within a given layer and/or between different layers. By locally varying the composition of the metallic powder a coefficient of thermal expansion (CTE) of the mirror body can vary locally, i.e. the CTE of the mirror body can take on different values in different parts of the mirror body. The composition of the metallic powder can be varied such that the CTE of the mirror body is adjusted to a local geometry of the mirror body. E.g. the CTE can be made smaller in areas of the mirror body which most strongly and/or most directly affect a shape of the optical surface. Also, the local composition of the metallic powder can be varied according to different levels of mechanical stress which different parts of the mirror body endure during handling and/or operation of the optical mirror. Advantageously, the local CTE of the mirror body is varied such that a location of a focal point of the mirror relative to the mirror is automatically adjusted and/or controlled as the temperature of the mirror changes. Preferably, the location of the focal point of the mirror relative to the mirror is controlled such that it remains constant under temperature variations.

A further advantageous embodiment of the invention provides that the metallic powder has a grain size of between 1 µm and 100 µm. A small grain size allows the mirror body to be formed particularly homogeneously even if the individual grains are not completely melted. Also, a small grain size facilitates the fusing and/or melting and/or bonding process as a ratio of surface over volume of the powder is increased.

The heat can be applied particularly effectively and flexibly by means of a laser beam. Lasers providing laser light at a wide range of different wavelengths and intensities are readily available as are optical components for manipulating the laser beam. Manipulating the laser beam can comprise shaping and/or guiding and/or scanning and/or focussing the laser beam and/or controlling the laser power and/or controlling an intensity of the laser beam as a function of time.

The laser beam can be focused, in each of the layers, to a spot or to a focal volume with a diameter of between 10 µm and 500 µm, preferably of between 50 µm and 200 µm. At smaller spot sizes higher intensities of the laser beam within the spot or within the focal volume can be reached with a given maximum power provided by the laser. Preferably, spatial dimensions of the focal volume are adjusted to the thickness of the layer which is being fused and/or sintered at a given instant. The spatial dimensions of the focal volume can determine the spatial accuracy, i.e. the spatial resolution with which the mirror body is formed, smaller spatial dimensions of the focal volume providing higher spatial resolution.

The laser beam can be applied in a pulsed mode or in a continuous wave mode. Operating the laser in the pulsed mode can provide particularly high peak values of a laser intensity, thereby facilitating the fusing and/or sintering of the metallic powder. A pulse duration of the laser pulses can be smaller than 5 ns, preferably smaller than 100 ps, more preferably smaller than 10 ps, whereby higher peak intensities can be provided at shorter pulse durations at a given maximum power of the laser beam.

A pulse repetition rate can be at least 10 kHz, preferably at least 1 MHz, more preferably at least 50 MHz, whereby a higher repetition rate allows more energy to be deposited for fusing the powder within a given time interval, thereby speeding up the forming process. An average power of the laser beam can be at least 10 W, preferably at least 100 W, more preferably at least 1 kW. A peak intensity of the laser beam can be at least 10 kW/mm$^2$, preferably at least 100 kW/mm$^2$, more preferably at least 10 MW/mm$^2$. A wavelength of the laser light emitted by the laser can range between 350 nm and 12 µm. Preferably, the wavelength is adapted to an absorption spectrum of the metallic powder.

It is particularly advantageous if one or several or preferably all of the above mentioned laser parameters are configured to be varied in the course of the forming of the mirror body. This way the fusing and/or sintering of the metallic powder and thus material properties of the mirror body in different parts of the mirror body can be precisely controlled.

In a further advantageous embodiment of the invention producing the mirror surface comprises coating at least the closed surface with an additional layer, the additional layer preferably furthermore covering the entire mirror body and/or a cavity surface of the at least one cavity. The additional layer can be chosen to have certain desired optical properties such as a desired minimum reflectivity or a desired reflectivity spectrum. The additional layer can be required if the top layer of the mirror body is porous while a dense and pit-free optical surface is necessary for the application. In this case, the additional layer is preferably thicker than the depth of the pores and machined and figured within the layer thickness to fulfil the optical specifications regarding shape and roughness. The additional layer can be the substrate for further additional layers such as reflectivity coatings, protection coatings or multilayer coatings. Also, the additional layer can be used as a protection of the mirror body material. The surface of the mirror body can e.g. be made more chemically inert, thereby preventing corrosion of the mirror body. If the cavity or the cavities are intended to conduct a coolant, coating the cavity surface with the additional layer can protect the mirror body material from the coolant.

In order to reduce mechanical distortions due to changes in temperature, it is particularly advantageous if a composition of the mirror body at the closed surface and a composition of the additional layer are chosen such that an absolute value of a difference between a coefficient of thermal expansion of the closed surface and a coefficient of thermal expansion of the additional layer is smaller than than $5\times10^{-6}$ K$^{-1}$, preferably smaller than $0.5\times10^{-6}$ K$^{-1}$. In this way, the athermal behaviour of the mirror can be increased and mechanical stresses which cause distortions of the mirror can be reduced.

A further advantageous aspect of the invention provides that the additional layer comprises a composition of nickel and phosphor or the additional layer comprises amorphous silicon. Preferably, also the nickel-phosphor composition is amorphous. Particularly in the case of the mirror body comprising aluminium and silicon a CTE of the nickel-phosphor composite of the additional layer can be easily and advantageously adapted to the CTE of the mirror body, thereby inhibiting temperature-induced mechanical stresses and/or distortions.

The coating of the closed surface and/or of the surface of the mirror body can be carried out with particularly high precision if the coating comprises applying one of a galvanic process, a physical vapour deposition process and a chemical vapour deposition process. The coating can also comprise slip-casting a ceramic material. Preferably, the coating is carried out such that the additional layer has a thickness of between 1 µm and 700 µm. The cited coating techniques provide accurate control of a chemical and/or physical composition and/or of the thickness of the additional layer.

The mirror surface can be given a desired shape with high accuracy if producing the mirror surface comprises machining or figuring the closed surface and/or machining or figuring an additional layer deposited on the closed surface. In particular, the machining or figuring may be employed during various stages of the production process. E.g. the closed surface and/or the additional layer deposited on the closed surface may be machined or figured repeatedly with increasing accuracy.

The machining or figuring can be carried out to draw a shape of the closed surface and/or of the additional layer deposited on the closed surface close to a desired shape determined e.g. from an optical design model of the closed surface and/or of the additional layer. E.g. producing the mirror surface can be carried out such that a shape of the mirror surface is one of planar, spherical, aspherical, concave and convex. Alternatively, the mirror surface can be freely shaped and, in particular, be not rotationally symmetric (freeform).

Preferably, before coating the closed surface with the additional layer a deviation of the shape of the closed surface from the desired shape is less than 5 µm, more preferably less than 1 µm, whereby the maximum deviation, i.e. the desired accuracy can be adjusted depending on the thickness of the additional layer. E.g. the deviation can be larger for larger values of the thickness of the additional layer.

Producing the mirror surface can be carried out with high accuracy, fast and flexibly if it comprises one of polishing, grinding, turning, diamond turning, milling, diamond milling and ion beam figuring (IBF).

A further advantageous implementation of the claimed method comprises a heat treatment of the mirror body during and/or after the forming of the mirror body for reducing mechanical stresses within the mirror body. The heat treatment can comprise exposing the mirror body to temperatures above 150° C., above 400° C., above 600° C. or above 800° C., depending on a melting temperature of the metallic powder used. E.g. the heat treatment can comprise placing the mirror body in a furnace.

An optical device comprising the optical mirror which is produced by means of the above described method is preferably designed as being a telescope or a light source or a beam shaping optics or a collector mirror in an EUV light source or in any other light source.

A light weight optical mirror which can be manufactured by the method described above comprises a monolithic metallic mirror body and a mirror surface at a closed surface of the mirror body, the mirror body having a closed rear surface averted from the mirror surface, wherein the mirror surface and the rear surface are connected by a plurality of walls, the walls enclosing a plurality of cavities, each of the cavities being connected to at least two distinct openings at a surface of the mirror body.

In an advantageous embodiment of the light weight optical mirror the walls are arranged in a honeycomb-like structure. Arranging the walls in a honeycomb-like structure yields a high level of mass reduction while providing the mirror with a high degree of stability and stiffness.

Figure 2:
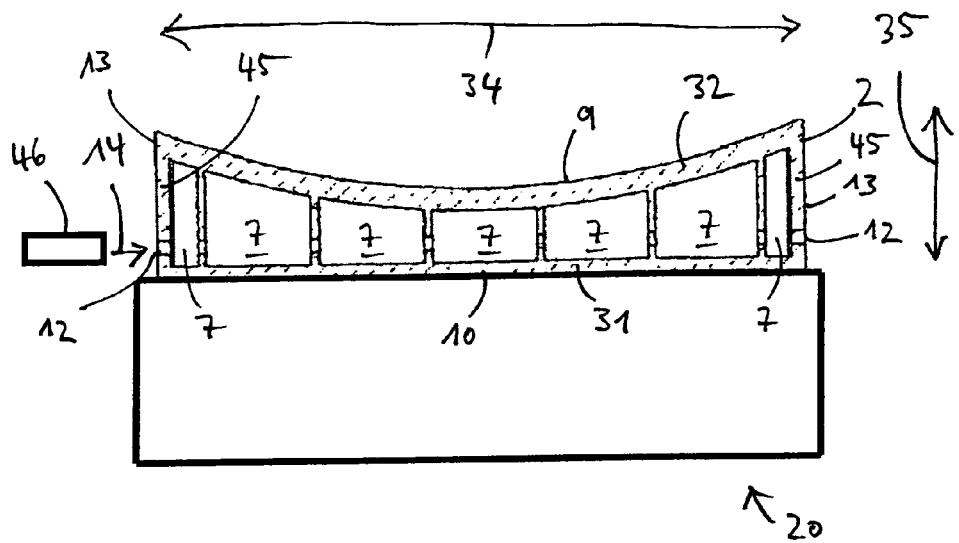
Figure 3:
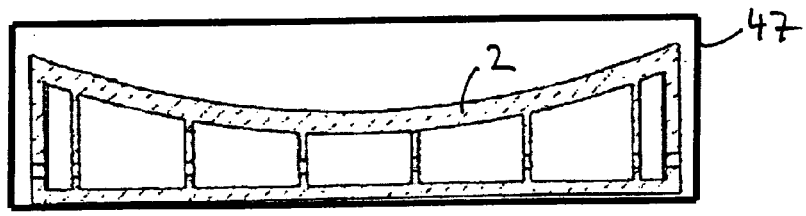
Figure 4:
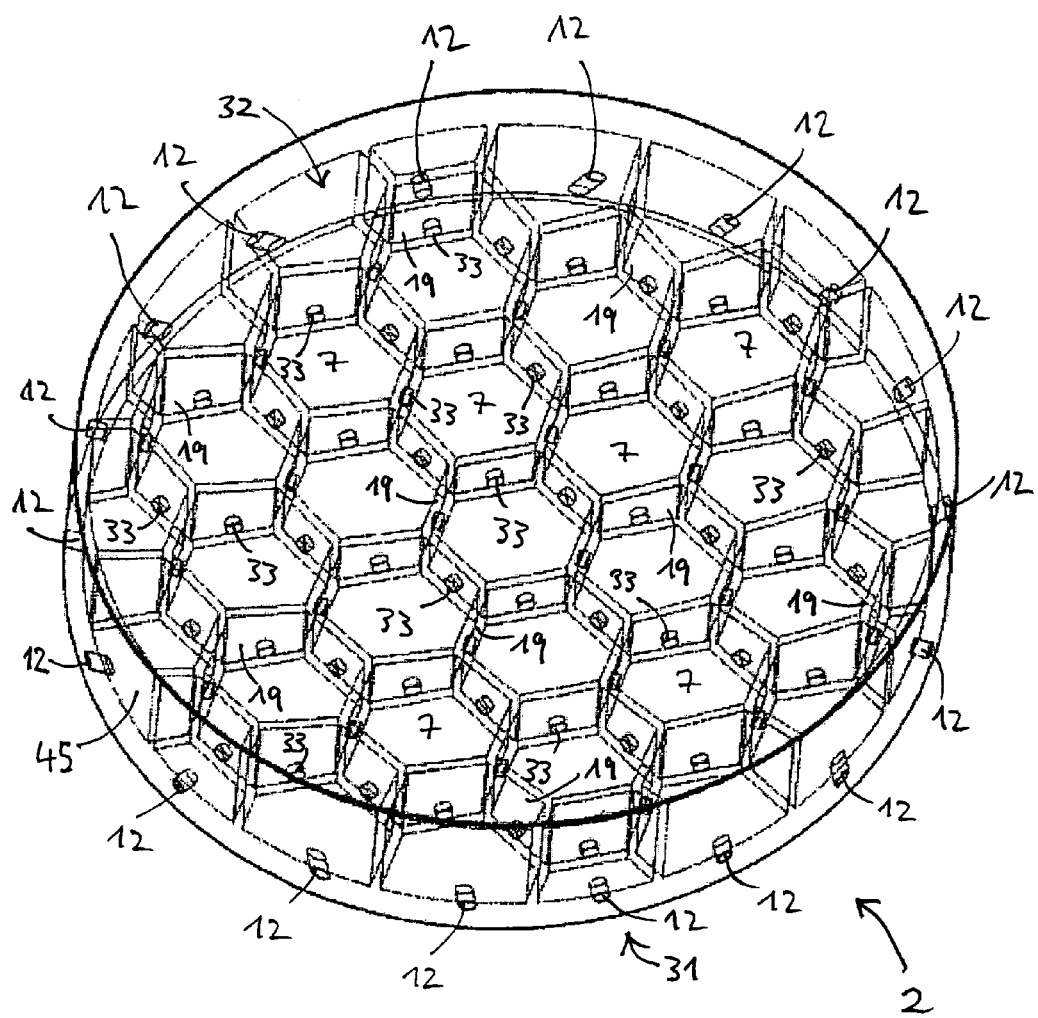
Figure 5:
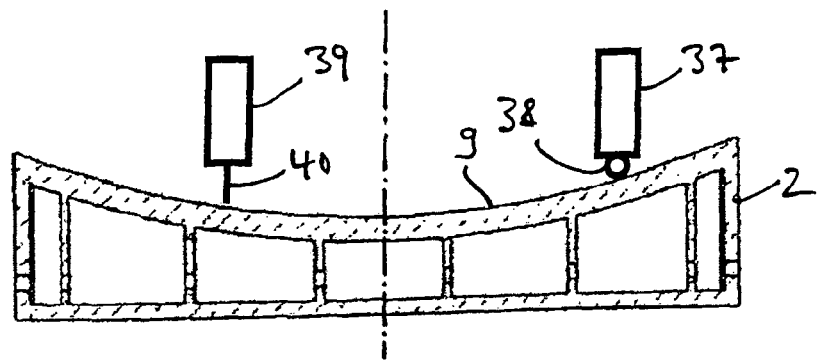
Figure 6:
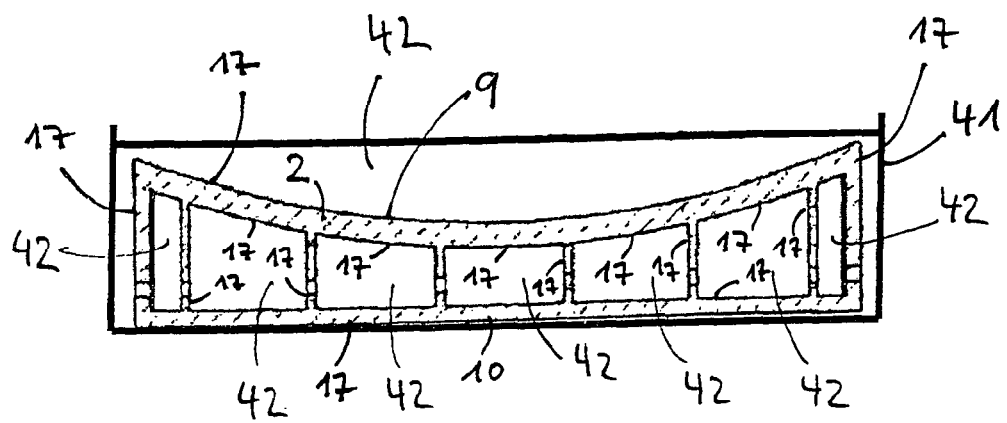
Figure 7:
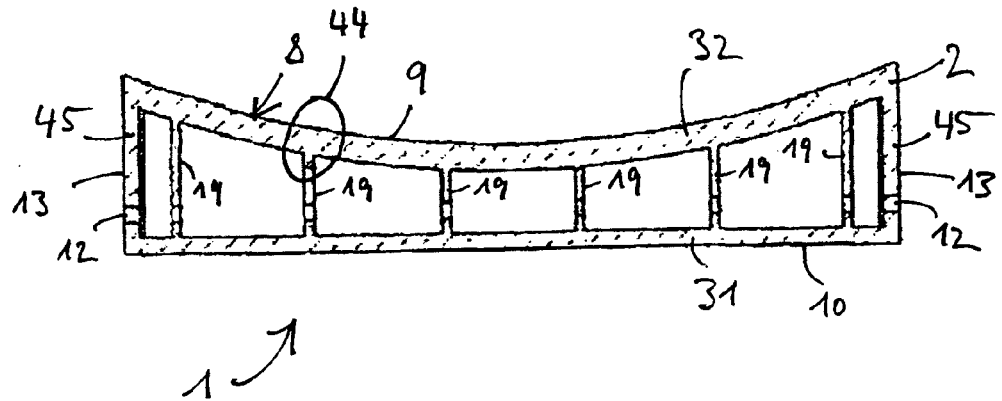
Figure 8:
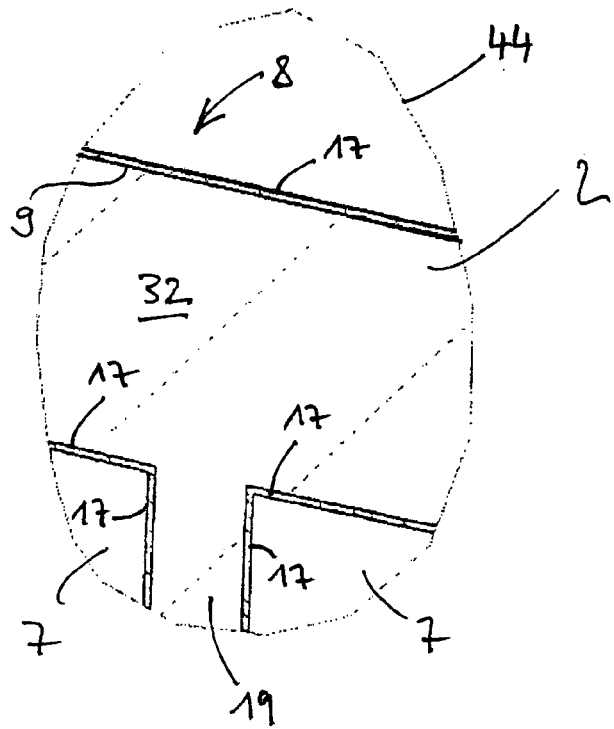
Figure 9:
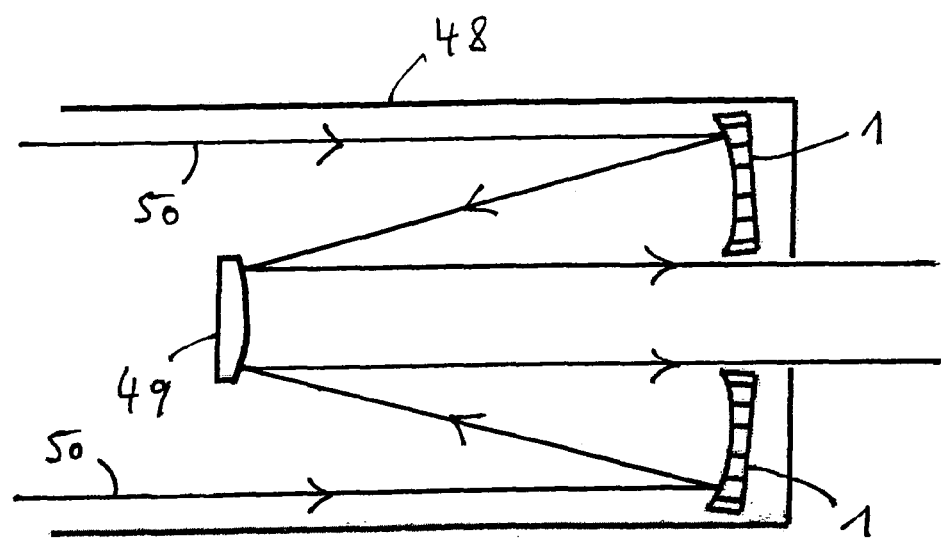
Figure 10:
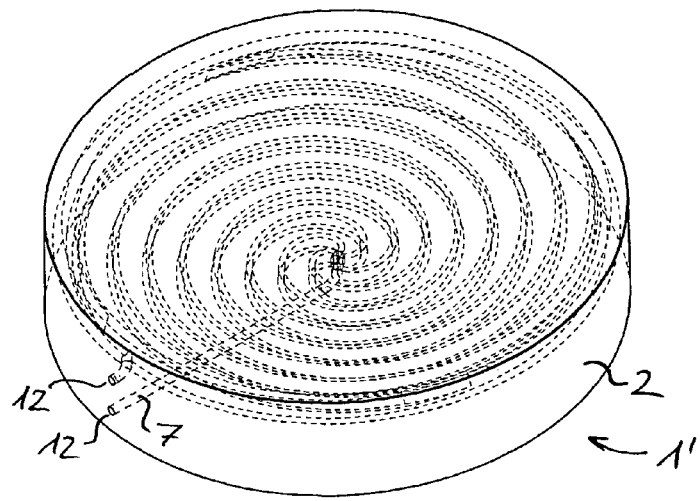
Figure 11:
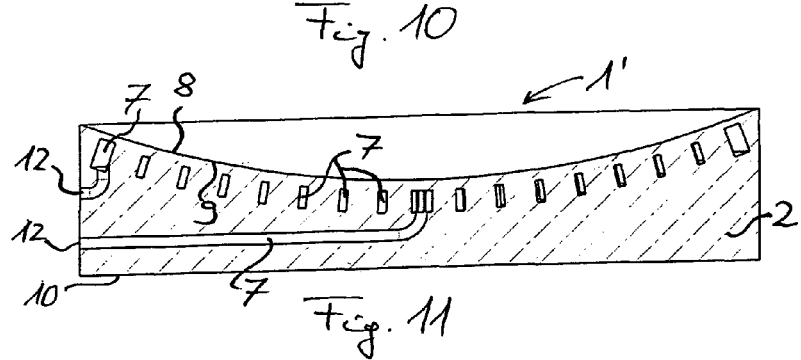
Figure 12:
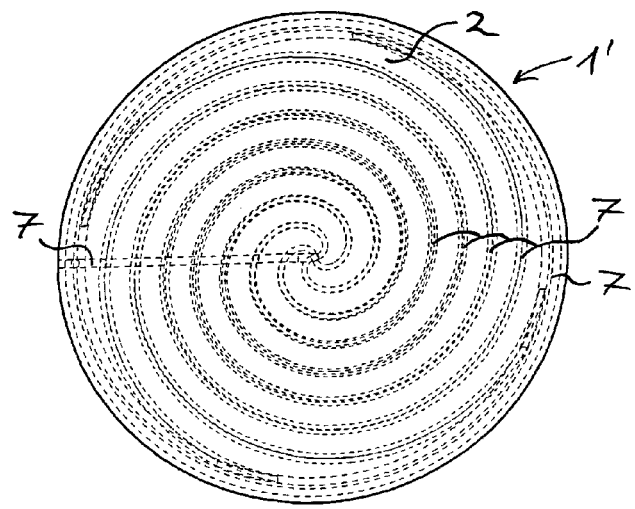

The invention will now be described by way of example with reference to the accompanying drawings in which FIGS. 1*a-d* are schematics illustrating different stages of forming a metallic mirror body of a light weight optical mirror in a laser sintering process, FIG. 2 is a schematic depicting the forming of cavities within the mirror body by blowing out unsintered metallic powder from unsintered regions within the mirror body, FIG. 3 is a schematic showing the mirror body in a furnace, FIG. 4 is a perspective drawing of the mirror body, FIG. 5 is a schematic demonstrating machining of a closed surface of the mirror body, FIG. 6 is a schematic showing the mirror body in an electroplating bath and FIG. 7 is a schematic of a light weight optical mirror with the same mirror body, FIG. 8 is a schematic of a detail of the light weight optical mirror shown in FIG. 7, FIG. 9 is a reflector telescope comprising a light weight optical mirror of the type shown in FIG. 7, FIG. 10 is a perspective drawing of a mirror in a second embodiment, FIG. 11 is a cross-sectional view of the mirror shown in FIG. 10 and FIG. 12 is a top view of the same mirror.

FIGS. 1*a-d* show a mould 20 inside of which a mirror body 2 (FIGS. 1*b-d*) of a light weight optical mirror 1 (see FIGS. 7, 8) is formed from metallic powder in a laser sintering process. The forming of the mirror body 2 is carried out according to a three dimensional CAD model of the mirror body 2 which is stored in a control unit (not shown). The mould 20 comprises a base 21, outer walls 22 and a lifting platform 23 which is arranged horizontally within the mould 20 and which can be moved up and down along a vertical z-direction 24. In FIGS. 1*a-d* the lifting platform 23 is shown at different vertical positions 24*a*, 24*b*, 24*c* and 24*d* with respect to the base 21. The outer walls 22 and the lifting platform 23 enclose a variable storage volume, a variable depth 25 of which is shown in FIGS. 1*a-d*. The storage volume is accessible from an open upper side of the mould 20.

At a beginning of the laser sintering process, shown in FIG. 1*a*, the lifting platform 23 is positioned at the initial vertical position 24*a* and an initial layer 4*a* of the metallic powder is deposited evenly on the lifting platform 23 by means of a powder deposition mechanism (not shown). The metallic powder forming the initial layer 4*a* is a composition of aluminium and silicon with an average grain size of 50 µm. Of course the metallic powder could comprise other metals or compositions of metals, such as e.g. a composition of aluminium and beryllium. Also, non metallic additives may be added to the metallic powder. In the course of the forming of the mirror body 2 a silicon component of the metallic powder is varied between 30 and 75 percent by weight. A thickness of the initial layer 4*a* is 100 µm. Within the initial layer 4*a* individual grains of the metallic powder are partially and/or completely melted and fused or sintered together by scanning a laser beam 15 emitted by a laser 27 over the initial layer 4a, thereby forming a closed surface 10 of a closed rear wall 31 of the mirror body 2 (FIGS. 1b-d).

At a given instant, a lens 28 focuses the laser beam 15 within the initial layer 4a to a focal spot 16 with a diameter of about 200 µm, thereby fusing the individual grains of the metallic powder over the entire thickness of the initial layer 4a. The laser 27 emits pulses of infrared laser light at a wavelength of 1060 nm, an individual laser pulse having a duration of 100 ps and the pulses being emitted at a rate of 1 MHz. An average beam power of the laser beam 15 is 100 W, resulting in a pulse energy of an individual laser pulse of 100 µJ.

After the initial layer 4a has been fused by means of the laser beam 15, the lifting platform 23 is lowered by slightly less than 100 µm to a next vertical position (not shown) and a second layer of the metallic powder is deposited via the powder deposition mechanism. The laser beam 15 is again scanned over the second layer, thereby fusing or sintering individual grains of the metallic powder of the second layer and bonding the second layer to the initial layer 4a deposited in the previous, i.e. in the initial step.

Subsequently, this process is repeated until the mirror body 2 is build up, layer by layer, wherein the laser beam 15 fuses or sinters the metallic powder in subareas of the different layers and bonds each of these subareas to a previously deposited layer. The subareas, inside which the metallic powder is at least partially fused or sintered, may form only a part of the respective layer. In this case, the metallic powder is not fused or bonded outside the subarea of the respective layer. The subareas may also comprise the entire layer. The different layers correspond to two-dimensional sectional areas of the three-dimensional CAD model of the mirror body 2. The control unit reads out the data defining the three-dimensional CAD model of the mirror body 2 and controls the movement of the laser 27 over the subarea of a given layer according to that data.

FIG. 1b illustrates the laser sintering process after depositing a plurality of layers of the metallic powder and sintering or fusing them in the corresponding subareas of the previously deposited layers, thereby forming a lower part of the mirror body 2. Here and in all of the following recurring features are indicated with identical reference signs. Until the instance of the laser sintering process shown in FIG. 1b the rear wall 31, parts of inner walls 19 and parts of a side wall 45 of the mirror body 2 have already been formed via fusing of the metallic powder. The lifting platform 23 is positioned at the vertical position 24b and a layer 4b of the metallic powder has been deposited on top the previously applied layers, the layer 4b having a homogeneous thickness of 120 µm, i.e. the layer 4b being slightly thicker than the initial layer 4a. The average grain size of the metallic powder used to form the layer 4b in FIG. 1b is 80 µm and the silicon component of the metallic powder used to form the layer 4b is 50 percent by weight. I.e. with respect to the forming of the initial layer 4a, the composition and the grain size of the metallic powder used to form the layer 4b have been altered slightly. Also, the diameter of the focal volume of the laser beam 15 has been decreased to 150 µm by changing optical properties of a beam path of the laser beam 15 (not shown). As a result of this parameter change a part of the mirror body 2 which is formed by fusing and bonding a subarea 5b of the layer 4b has a CTE and a hardness different from a CTE and a hardness of the closed rear wall 31 of the mirror body 2.

FIG. 1b further illustrates that the metallic powder remains in an unfused state in regions 6 in which the metallic powder has not been sintered or fused, e.g. by temporarily switching off or blocking the laser beam 15 during the scanning or moving of the laser beam 15. Also, it can be seen from FIG. 1b that the subarea 5b amounts to only a fraction of the layer 4b, regions of the layer 4b lying outside the subarea 5b constituting an uppermost layer of the unsintered regions 6. The fused subarea 5b forms a section of the inner walls 19 of the mirror body 2, the inner walls 19 and the side wall 45 being connected to the closed rear wall 31 of the mirror body 2 and the inner walls 19 separating the unsintered regions 6.

FIG. 1c depicts the laser sintering process at yet a later step. With respect to the step described with respect to FIG. 1b the lifting platform 23 has been further lowered to the vertical position 24c. An average grain size of the metallic powder forming a newly deposited layer 4c is 70 µm and a silicon component of the metallic powder forming the layer 4c is 65 percent by weight. Of course it is also possible to vary the composition of the metallic powder within a given layer of the deposited metallic powder. In a subarea 5c of the layer 4c the laser beam 15 fuses or sinters the metallic powder and bonds the subarea 5c to a previously deposited layer, thus adding another layer to the mirror body 2. The subarea 5c in FIG. 1c forms part of a closed front wall 32 of the mirror body 2. Outside the subarea 5c of the layer 4c the metallic powder of the layer 4c is not sintered, forming again an uppermost layer of the unsintered regions 6.

FIG. 1d shows a final stage of the laser sintering process. With respect to FIG. 1c the lifting platform 23 has been further lowered to the final vertical position 24d. While the metallic powder in the regions 6 is not sintered or fused or bonded, the fused subareas of the various layers form the monolithic metallic mirror body 2. The mirror body 2 comprises the closed rear wall 31, the concave closed front wall 32, the inner walls 19 and the side wall 45, the inner walls 19 and the side wall 45 connecting the rear wall 31 and the front wall 32. The front wall 32 is concluded by a closed surface 9 of the metallic mirror body 2.

FIG. 2 shows the forming of a plurality of cavities 7 within the mirror body 2. The cavities 7 are formed by removing the unfused metallic powder from the unsintered regions 6 (FIG. 1d). I.e. the cavities 7 comprise those unsintered regions 6 lying within the mirror body 2. The removing of the unsintered metallic powder is carried out by blowing out the unsintered metallic powder from the regions 6 using compressed air 14, which is provided by a movable nozzle 46. Equivalently, the nozzle 46 could provide any other compressed gas for blowing out the metallic powder from the regions 6, e.g. compressed nitrogen. Advantageously, an abrasive medium such as grains of sand or metal could be added to the compressed air 14 or to the compressed gas.

Blowing out the cavities 7 by means of the compressed air 14 is simplified by the fact that during the sintering process described above each of the cavities 7 is shaped or formed in such a way that it has and/or is connected to at least two distinct openings 12 at a surface 13 concluding the side wall 45 of the mirror body 2. The cavities 7 are described in greater detail with respect to FIG. 4.

Notably, the mirror body 2 is shaped in such a way that the rear wall 31 and the front wall 32 of the mirror body 2 completely seal the mirror body 2 on their respective sides of the mirror body 2. In other words, the mirror body 2 features a closed surface 9 concluding the front wall 32 of the mirror body and a closed rear surface 10 concluding the rear wall 31 of the mirror body, the closed surface 9 and the closed rear surface 10 lending the mirror body 2 a particularly high degree of stiffness and stability. In an alternative embodiment of the presently described mirror body 2, holes can be provided in the rear wall 31 and/or the front wall 32 of the mirror body 2, these holes, however, amounting to less than 20 percent, preferably less than 5 percent of the rear surface 10 of the rear wall 31 or of the closed surface 9 of the front wall 2 of the mirror body 2.

In the embodiment described here, a thickness of the front wall 32, a thickness of the rear wall 31 and a thickness of the side wall 45 are each approximately 3 mm to 10 mm. A thickness of the inner walls 19 is approximately 1 mm to 3 mm. A diameter 34 of the mirror body 2 is about 400 mm. At the side wall 45 a maximum height 35 of the mirror body 2 is approximately 15 mm to 150 mm. A density of the aluminium-silicon composite from which the mirror body 2 has been formed in the sintering process varies locally between 2.1 g/cm$^3$ and 2.7 g/cm$^3$, parts of the mirror body 2 which are under high mechanical stress being formed to exhibit a higher local density than other parts which are under lower mechanical stress. The local density of the mirror body 2 is a function of parameters such as the composition of the aluminium-silicon composite, the grain size of the metallic powder and the parameters of the laser beam 15 (FIGS. 1*a-d*) such as the beam intensity, the diameter of the focal spot 16 and a laser dwell time, wherein the latter is a time interval during which the laser beam 15 stays at a given position while fusing and/or sintering the metallic powder at that position.

After the cavities 7 have been formed the mirror body 2 is undergoing a heat treatment, as shown in FIG. 3. To this end the mirror body 2 is placed in a furnace 47, the furnace 47 heating the mirror body 2 to a temperature of below 500° C., which is still well below the melting temperature of the aluminium-silicon composite from which the metallic mirror body 2 has been shaped in the sintering process. Due to the heating of the mirror body 2 inside the furnace 47, mechanical stresses within the mirror body 2 which may build up during the primary shaping process of the mirror body 2 are gradually reduced while an overall structure of the mirror body 2 remains unchanged.

FIG. 4 shows a three-dimensional transparent view of a structure of the mirror body 2. All walls or surfaces of the mirror body 2 are depicted only by lines delimiting the respective wall or surface. It can be clearly seen that the mirror body 2 is approximately cylindrical, the closed rear wall 31 having a circular shape. Furthermore, the inner walls 19 divide an interior of the mirror body 2, i.e. a part of the mirror body 2 enclosed by the completely closed front wall 32, the likewise completely closed rear wall 31 and the side wall 45, into a plurality of cells or compartments, the cells or compartments forming the cavities 7. The inner walls 19 are arranged in a honeycomb-like structure, thereby connecting the rear wall 31 and the front wall 32. Neighbouring cavities 7 are connected via through holes 33 in the respective inner wall 19 separating the respective neighbouring cavities 7. Each of the cavities 7 bordering on the side wall 45 of the mirror body 2 is further connected to an exterior of the mirror body 2 through one of the openings 12 piercing the side wall 45. In FIG. 4 only a subset of the cavities 7, the side walls 19 and the through holes 33 are marked with their corresponding reference sign for matters of clarity.

The regular honeycomb-like structure of the inner walls 19 and the fact that the inner walls 19 serve as rigid bridges between the front wall 32 and the rear wall 31 grant the mirror body 2 a high degree of stiffness and stability. A surface area of the inner walls 19 is a few square centimeters with an area of the through holes 33 arranged in the inner walls 19 amounting to less than five percent of the surface area of the respective inner walls 19 in which they are arranged. Due to the nearly hyperbolic shape of the front wall 32, the surface area of the inner walls 19 decreases from the side wall 45 towards a centre of the mirror body 2.

Due to the introduction of the cavities 7, a mass of the mirror body 2 is significantly reduced as compared to a solid, i.e. non-hollow body with an identically formed outer surface. In the present embodiment of the mirror body 2 the cavities 7 are formed such that a volume of the cavities 7 amounts to approximately 90 percent by volume of the mirror body 2, the volume of the mirror body 2 being given by the volume enclosed by the mirror body's outer surfaces 9, 10 and 13. In addition, the cavities 7 have been formed in such a way that they comprise at least a section of a neutral axis of the mirror body 2, wherein the neutral axis is an axis of the mirror body 2 along which longitudinal stresses or strains are minimal as the mirror body 2 is bent or distorted.

FIGS. 5 and 6 illustrate different steps in the production of a mirror surface 8 (see FIG. 8) at the closed surface 9 of the front wall 32 of the mirror body 2. Specifically, FIG. 5 demonstrates the process of machining the closed surface 9 by means of a machining technology. FIG. 6 depicts the process of depositing on the closed surface 9, on the rear surface 10, on the surface 13 and on cavity surfaces 36 an additional layer 17 (FIG. 7) in an electroplating bath.

FIG. 5 shows the mirror body 2 mounted on a rotating air bearing spindle, a tool holder 37 of a diamond turning, lathe with a diamond 38 arranged thereon and a surface measuring device 39 with a measuring tip 40, the surface measuring device 39 being configured to measure a constitution of the closed surface 9. The tool holder 37 is moved over the closed surface 9 by a corresponding further control unit (not shown), whereby a relative orientation of the tool holder 37 with respect to the closed surface 9 can be controlled with a precision down to about 20 nm in all spatial directions. In this manner the diamond turning lathe cuts, by means of the diamond 38, the closed surface 9 with high precision giving the closed surface 9 a desired shape, the desired shape of the closed surface 9 being determined by the optical design model of the mirror body 2 stored in the control unit.

Preferably, the diamond turning of the closed surface 9 is performed in a number of steps, a precision of the turning process being increased between subsequent steps. After each of these steps the shape of the closed surface 9 is measured using the surface measuring device 39 and a result of this measurement is compared with the desired shape of the closed surface 9. Based on this comparison the control unit which controls the movement and the orientation of the tool holder 37 conducts another run, thereby drawing the shape of the closed surface 9 closer to the desired shape. For instance, in a first turning step the closed surface 9 is machined with a precision of 3 μm, in a second step the closed surface 9 is machined with a precision of 1 μm and in a third turning step the closed surface 9 is machined with a precision of 300 nm. In variations of the presently described embodiment of the invention, the machining and/or figuring of the closed surface 9 could alternatively or further comprise polishing and/or grinding and/or milling and/or ion beam figuring (IBF) the closed surface 9 and/or an application of related machining or figuring techniques.

In a subsequent step of the production of the mirror surface 8, which is illustrated in FIG. 6, the mirror body 2 is completely immersed in a solution 42 comprising nickel, the solution 42 being contained in a basin 41. In this manner, the additional layer 17 is deposited, by a galvanic process, on the closed surface 9, on the rear surface 10, on the side surface 13 and on cavity surfaces of the mirror body 2, the layer 17 comprising nickel. In particular, the amorphous layer 17 may be composed of amorphous nickel and phosphor. Alternatively, a different deposition process could be carried out such that the additional layer 17 comprises phosphor, amorphous silicon or a dielectric material.

Thus, after completion of the galvanic deposition process the additional layer 17 covers the entire mirror body 2, i.e. the entire surface of the mirror body 2 including the cavity surfaces. In particular, the layer 17 forms the mirror surface 8 on the closed surface 9 of the mirror body 2. A thickness of the additional layer 17 after the deposition process could be approximately 3 μm if this layer is made of silicon and is between 20 μm and 700 μm in the case of a nickel-phosphorous layer. In alternative embodiments of the invention, the additional layer 17 could be deposited on the closed surface 9 and/or on the entire surface of the mirror body 2 in a physical vapour deposition process and/or in a chemical vapour deposition process or any other deposition or coating process fit to create the mirror surface 8 on the metallic mirror body 2.

If desired, a shape of the mirror surface 8 thus produced can be again measured using the surface measuring device 39 described in FIG. 5 and compared to a desired shape of the mirror surface 8, the desired shape of the mirror surface being stored in the optical design model of the mirror body 2. If a deviation between the shape of the mirror surface 8 and the desired shape of the mirror surface 8 is found to exceed a maximum tolerance of e.g. 1 μm, the additional layer 17 may again be machined or figured by means of a suitable machining or figuring technique as described above with reference to FIG. 5.

In a typical embodiment of the method for manufacturing the mirror 1, the closed surface 9 is, before depositing the additional layer 17, machined only with a precision of about 3 μm. Then the layer 17 containing nickel and phosphor is deposited on the closed surface and thereafter, the diamond turning process is iteratively repeated as described above for increasing the accuracy. After that, the additional layer 17 can be polished, and finally it may be treated by ion beam figuring for additional corrections.

In the present example, the completed mirror surface 8 has an aspherical shape, e.g. a hyperbolic shape. Instead, the mirror surface 8 can be given any other spherical, aspherical, planar, concave or convex shape or can be freely shaped.

FIG. 7 shows a thus manufactured light weight optical mirror 1. The light weight optical mirror comprises the metallic mirror body 2 which encompasses the closed rear wall 31, which is concluded by the closed rear surface 10, and the closed concave front wall 32, which is with the closed surface 9, wherein the closed rear surface 10 is averted from the closed surface 9. The mirror surface 8, which is formed by the additional layer 17, is arranged at the closed surface 9. The rear wall 31 and the front wall 32 are connected by the inner walls 19 and by the side wall 45, the inner walls 19 and the side wall 45 enclosing the cavities 7. Each of the cavities 7 is connected to at least two of the openings 12 at the surface 13 of the side wall 45, the openings 12 perforating the side wall 45. The inner walls 19 are arranged in a honeycomb-like structure (FIG. 4).

FIG. 8 shows a detail 44 of the light weight optical mirror 1, the detail showing a part of the front wall 32 concluded by the closed surface 9, a part of one of the inner walls 19 with the corresponding adjacent cavities 7 and a part of the mirror surface 8 formed by the additional layer 17. The additional layer 17 is also shown to cover the cavity walls 36 which conclude the inner wall 19 and a back side of the front wall 32. It should be noted that in FIG. 8 the thickness of the front wall 32 and the thickness of the inner wall 19 are not depicted to scale with respect to the thickness of the additional layer 17. Notably, the forming of the mirror body 2 and of the mirror surface 8 have been carried out such that a CTE of the mirror surface 8 and a CTE of the mirror body 2 at the closed surface 9 match or nearly match. In other words, a composition and/or a physical constitution of the mirror body 2 at the closed surface 9 and a composition and/or physical constitution of the additional layer 17 forming the mirror surface have been created such that an absolute value of a difference between the CTE of the closed surface 9 and the CTE of the mirror surface 8 is smaller than e.g. one percent of the CTE of the mirror body 2 at the closed surface 9 or smaller than $0.5 \times 10^{-6}$ $K^{-1}$.

FIG. 9 shows a reflecting telescope 51 comprising a telescope frame 48, a convex secondary mirror 49 and a light weight optical mirror 1 of the kind described above. This light weight mirror 1 is used for focussing incoming light rays 50 onto the secondary mirror 49 and differs from the mirror shown in FIG. 7 only by a through opening which is provided in a central area of the mirror 1 for coupling out the light reflected by the secondary mirror 49. Of course the light weight optical mirror 1 could equally well be used in other optical devices such as light sources including EUV light sources, microscopes, spectrometers, cameras or the like.

The FIGS. 10 to 12 show a monolithic mirror 1' which is manufactured in exactly the same way as the mirror 1 for which the manufacturing process has been described above in detail. Features which have been described above in the context of the mirror 1 are marked with the same reference signs as in the preceding figures. The cavities 7 are, in this case, a system of cooling channels for conducting a coolant such as a fluid or a gas. One of the two openings 12 can be used for supplying the coolant, a second of the openings 12 being an outlet for this coolant.

The invention claimed is:

1. A method for manufacturing a light weight optical mirror or for manufacturing a monolithic mirror with at least one cooling channel, the method comprising
    forming a mirror body, including
        iteratively depositing a metallic powder in layers; and
        applying, for each of the layers heat at least in a subarea of the layer, thereby fusing or sintering the powder in the subarea and bonding it to a previously deposited layer,
    the powder remaining in an unfused state in at least one region; and the method further comprising
        forming at least one cavity within the carrier by removing the unfused powder from said region and
        producing a mirror surface at a closed surface of the mirror body by machining and/or figuring and/or coating.

2. The method according to claim 1, wherein the mirror body is formed such that a rear surface of the mirror body is closed, the rear surface being arranged on a side of the mirror body averted from the mirror surface.

3. The method according to claim 1, wherein the at least one cavity is formed to comprise a channel or a system of channels for conducting a liquid or a gas.

4. The method according to claim 1, wherein the cavity is formed such that it comprises at least a section of a neutral axis of the mirror body.

5. The method according to claim 1, wherein the at least one cavity is formed such that it amounts to between 50 and 90 percent by volume of the optical mirror.

6. The method according to claim 1, wherein the cavity is formed or each of the cavities are formed to include at least two distinct openings at a surface of the mirror body.

7. The method according to claim 1, wherein removing the unfused powder comprises blowing out the at least one cavity.

8. The method according to claim 1, wherein the metallic powder is deposited in a composition comprising aluminium and silicon or in a composition comprising aluminium and beryllium or any aluminium alloy.

9. The method according to claim 1, comprising varying a composition of the metallic powder in the course of the forming of the mirror body.

10. The method according to claim 1, wherein the metallic powder has a grain size of between 1 μm and 100 μm.

11. The method according to claim 1, wherein the heat is applied by a laser beam.

12. The method according to claim 1, wherein producing the mirror surface comprises coating at least the closed surface with an additional layer, the additional layer covering the entire mirror body and/or a cavity surface of the at least one cavity.

13. The method according to claim 12, wherein a composition of the mirror body at the closed surface and a composition of the additional layer are chosen such that an absolute value of a difference between a coefficient of thermal expansion of the closed surface and a coefficient of thermal expansion of the additional layer is smaller than $5 \times 10^{-6}$ $K^{-1}$.

14. The method according to claim 12, wherein the additional layer comprises a composition of nickel and phosphor or in that the additional layer comprises amorphous silicon.

15. The method according to claim 12, wherein the coating comprises applying a galvanic process, a physical vapour deposition process, and/or a chemical vapour deposition process.

16. The method according to claim 1, wherein producing the mirror surface comprises machining or figuring the closed surface and/or machining or figuring an additional layer deposited on the closed surface.

17. The method according to claim 1, wherein producing the mirror surface comprises polishing, grinding, turning, diamond turning, milling, diamond milling, and/or ion beam figuring.

18. The method according to claim 1, the method further comprising a heat treatment for reducing mechanical stresses within the mirror body.

19. An optical device comprising a light weight optical mirror or a monolithic mirror comprising at least one channel produced by a method according to claim 1, the optical device including a telescope, a beam shaping optics or a collector mirror in a light source including an EUV light source.

20. A light weight optical mirror comprising a monolithic metallic mirror body and a mirror surface at a closed surface of the mirror body, the mirror body having a closed rear surface averted from the mirror surface, wherein the mirror surface and the rear surface are connected by a plurality of walls, the walls enclosing a plurality of cavities, each of the cavities being connected to at least two distinct openings at a surface of the mirror body.

21. The light weight optical mirror according to claim 20, wherein the walls are arranged in a honeycomb-like structure.

* * * * *